United States Patent [19]

Massa et al.

[11] Patent Number: 5,292,213
[45] Date of Patent: Mar. 8, 1994

[54] COUPLING DEVICE FOR HIGH-SPEED ROTATION

[75] Inventors: Ted R. Massa, Latrobe; David R. Siddle, Greensburg; John S. VanKirk, Murrysville, all of Pa.

[73] Assignee: Kennametal Inc., Latrobe, Pa.

[21] Appl. No.: 939,240

[22] Filed: Sep. 2, 1992

[51] Int. Cl.5 .................. B23B 31/10; B23C 5/26
[52] U.S. Cl. .................. 409/234; 279/2.2; 279/8; 279/129; 408/239 A; 409/239; 464/1
[58] Field of Search .............. 409/231, 232, 233, 234, 409/238, 239; 279/2.2, 129, 131, 2.22, 8, 900; 464/1, 70, 82; 408/239 A

[56] References Cited

U.S. PATENT DOCUMENTS

| | | | |
|---|---|---|---|
| 2,348,089 | 5/1944 | Niekirk | 29/105 |
| 2,356,245 | 8/1944 | Johnston | 279/131 X |
| 2,431,961 | 12/1947 | Phillips et al. | 279/131 X |
| 2,481,094 | 9/1949 | Edwards | 279/131 X |
| 2,678,487 | 5/1954 | Onsrud | 29/105 |
| 3,122,818 | 3/1964 | Nance | 29/105 |
| 3,795,455 | 3/1974 | Kosmowski | 279/131 X |
| 4,322,190 | 3/1982 | Anderson | 409/234 |
| 4,350,463 | 9/1982 | Friedline | 409/234 |
| 4,456,408 | 6/1984 | Glasow | 407/35 |
| 5,147,165 | 9/1992 | Tempest | 409/232 |

FOREIGN PATENT DOCUMENTS 0022017 11/1985 Japan .................. 409/234

Primary Examiner—Z. R. Bilinsky
Attorney, Agent, or Firm—James G. Porcelli

[57] ABSTRACT

A coupling device for high speed rotation applications comprised of a first member about a longitudinal axis having a collar integrally attached to a solid base and a second member about a longitudinal axis having a sleeve which is receivable within the collar. When the first and second members are rotated the sleeve expands within the collar to minimize or eliminate any clearance that may exist between the sleeve and collar. The coupling device may, among other applications, be utilized for machine tools such as milling cutters.

20 Claims, 5 Drawing Sheets

COUPLING DEVICE FOR HIGH-SPEED ROTATION

BACKGROUND OF THE INVENTION

The present invention relates to a mechanical coupling and more specifically to a coupling for use with machine tools rotating at high speeds.

Machining operations using high-speed rotating tooling are becoming more prevalent in industry. Such operations include, among other things, milling, drilling and boring. As an example, in drilling operations, a disposable tool such as a high-speed drill is used and provides easy insertion in and removal from a chuck when the drill needs to be reconditioned or replaced. It would be common for a machine operator to have an inventory of replacement drills so that the drilling operation would not be interrupted while a single drill bit is reconditioned or replaced. On the other hand, some rotating tooling used in machining operations is much more expensive than a single drill bit and becomes uneconomical to maintain a large inventory of parts.

One such example is the milling cutter 10 shown in FIG. 1. A typical milling cutter 10 is comprised of a shank 20 with an integral head 30 defining a back end 40 and a front end 50. Within the head 30 at the front end 50 are located a plurality of cutting inserts 60 mounted about the periphery of the head 30 and secured to the head with retaining screws 70. A flat 80 may be present on the shank 20 in order to provide a flat surface to grasp the shank 20 for imparting rotational motion into the milling cutter 10 in the performance of a milling operation. Unlike a drill used for boring holes within a material, a milling cutter 10 such as that shown in FIG. 1 would be used for an operation similar to that of planing in woodwork whereby the milling cutter 10 removes a layer of material along a plane perpendicular to the cutter axis. The milling cutter 10 is held and driven by a mechanism which securely grasps the shank 20 and imparts rotation.

The cutting edges of the cutting inserts 60 typically wear or break thereby requiring reindexing or replacement of insert 60. Cutting insert 60 in FIG. 1 is seen to be four-sided and, as such, may be indexed to expose unused edges to the workpiece. The milling cutter head 30 may also be damaged in a manner which requires the entire milling cutter 10 to be replaced. As such, there are occasions that require the milling cutter to be removed from the machine. While it would be preferred to have a plurality of milling cutters available in inventory, the cost of an individual cutter may be fairly expensive such that this would not be practical.

One solution to this problem would be to provide a milling cutter having a removable head such that an inventory of replacement heads with cutting inserts already attached would be available at any given time. In this manner, only a single shank of the milling cutter with a plurality of replacement heads would be required. This would alleviate the need to maintain an inventory of entire milling cutters. Additionally, if the head became damaged beyond repair, a savings may be realized by replacing the head rather than the entire milling cutter.

However, under such circumstances it would be important to secure the head to the shank in a manner closely resembling the configuration of the original milling cutter 10 thereby providing correct centering and alignment of the head relative to the shank. This is especially important when high speed milling cutters are utilized because any misalignment or improper positioning of the head relative to the shank could create an imbalanced condition of the tool which would be aggravated by the high rotational velocity of the tooling.

An object of this invention is to provide a replaceable head for a milling cutter shank thereby alleviating the need to replace the entire milling cutter.

Another object of the invention is to provide a simple and economical replaceable head for a milling cutter whereby an inventory of heads may be supplied at a reasonable cost.

Another object of this invention is to provide a replaceable head for a milling cutter which tends to be self-centering during high-speed operations.

Another object of the invention is to provide a coupling device which tends to become self-centered to a higher degree with increasing rotational velocity of the coupling device.

Another object of the invention is to provide a coupling device that when rotated at high speeds tends to be self-balancing.

Still another object of this invention is to provide a milling cutter capable of operation at high speeds in which a replaceable head may be easily installed or removed from the shank.

BRIEF SUMMARY OF THE INVENTION

A coupling device for high rotational speed applications is provided comprised of a first member symmetrical about a first longitudinal axis and having a captivating collar extending from a base to a collar front face to define a cavity within the collar. Also provided is a second member symmetrical about a second longitudinal axis which may be offset from the first longitudinal axis and having a captivated sleeve which is receivable within the cavity. The captivating collar is made of a resilient material and has a radial stiffness and the captivated sleeve is also made of a resilient material and has a radial stiffness which is less than that of the captivating collar. In this manner when the captivated sleeve is inserted within the captivating collar and the first member and second members are rotated, the captivated sleeve radially expands at a greater rate than the captivating collar and as the rotational speed increases contacts the captivating collar thereby tending to minimize or eliminate the offset between the first and second members.

In a second embodiment of the coupling device the second member is further comprised of a base to which the sleeve is integrally attached. Furthermore, the sleeve inner diameter is less than the collar diameter inner diameter and the sleeve length is equal to or greater than the collar length thereby providing the sleeve with a lower radial stiffness than the collar. In this manner, the sleeve may still expand within the collar, however, may provide an extension from the sleeve for other applications.

BRIEF DESCRIPTION OF THE DRAWINGS

The exact nature of the present invention will become more clearly apparent upon reference to the following detailed specification taken in connection with the accompanying drawings in which.

DETAILED DESCRIPTION OF THE INVENTION

Figure 1:
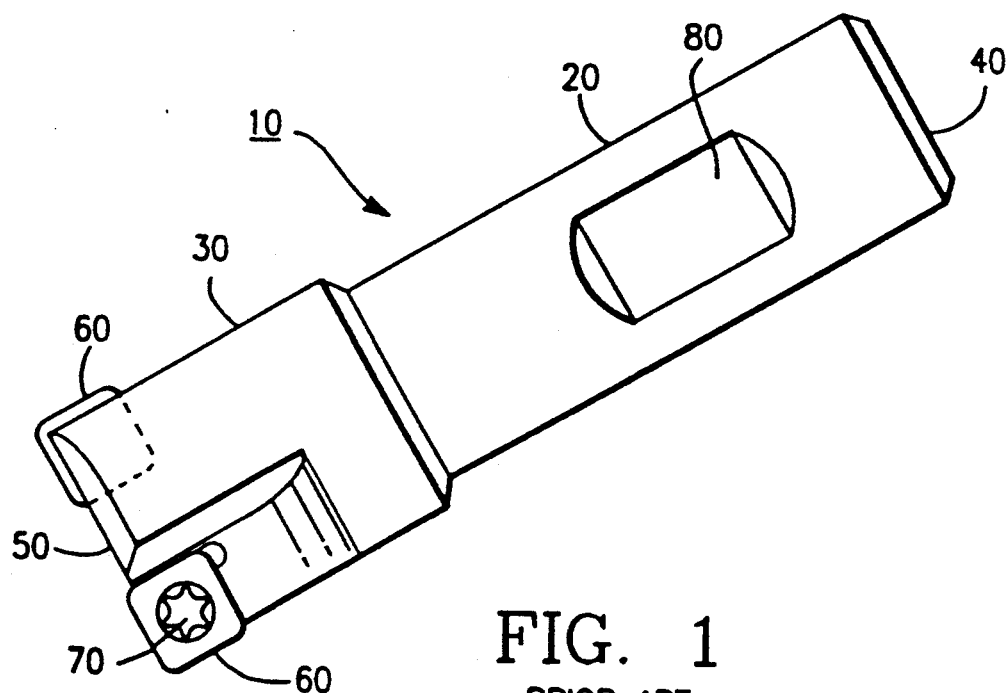
FIG. 1 is an isometric view showing a prior art milling cutter.
Figure 3:
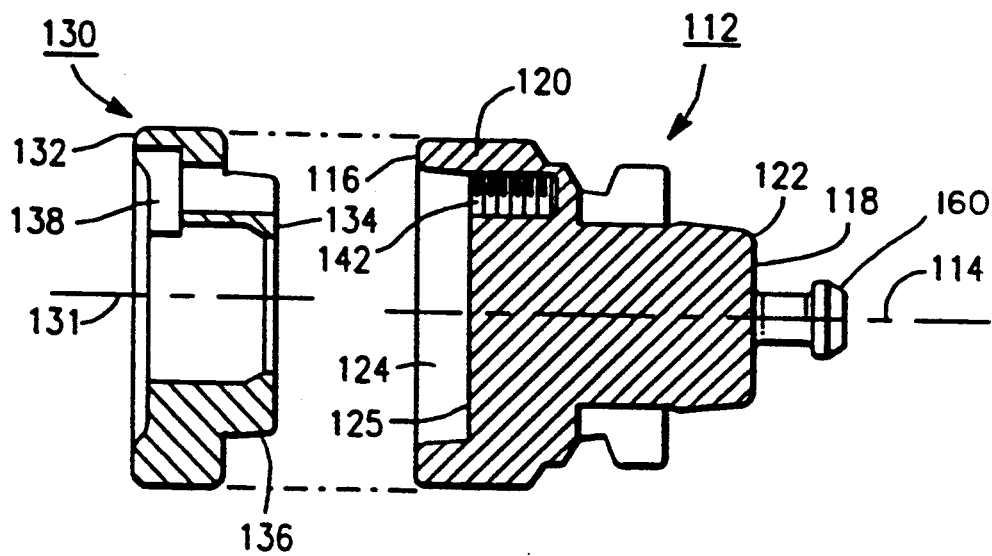
FIG. 3 is an exploded cross-sectional view of the coupling device viewed along lines III—III in FIG. 2.
Figure 2:
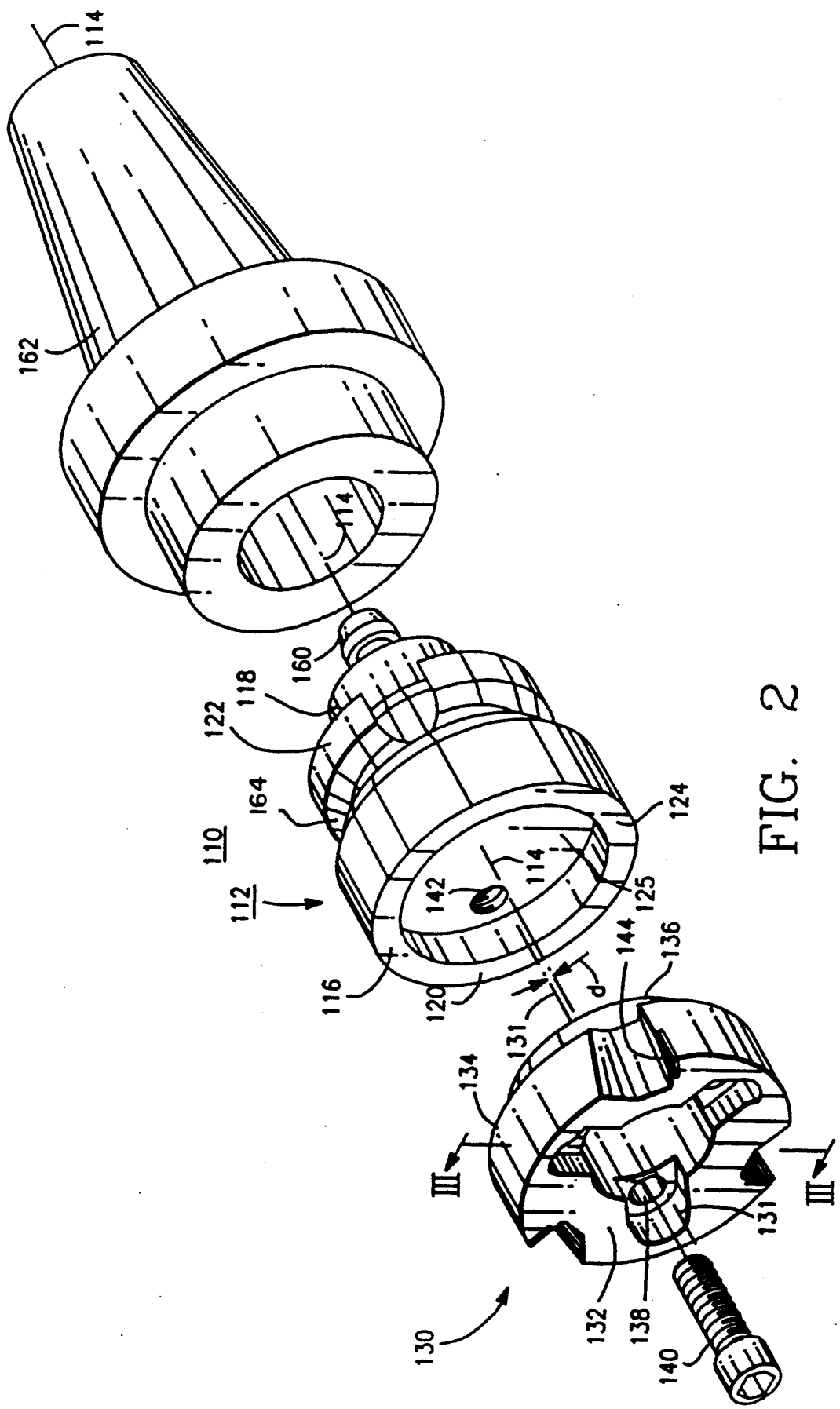
FIG. 2 is an exploded isometric view showing an embodiment of a coupling device according to the invention.

FIGS. 2 and 3 show one embodiment of the subject invention applied to a milling cutter 110. A first member or shank 112 is symmetrical about a first longitudinal axis 114. The shank 112 has a front end 116 and a back end 118. A captivating collar 120 extends from a base portion 122 of the shank 112 to the front end 116 of the shank 112 thereby defining a cavity 124 and a cavity floor 125 within the shank 112. The captivating collar 120 is made of a resilient material such as steel and, as a result, is capable of expanding radially.

A second member or head 130 is symmetrical about a second longitudinal axis 131 which is generally parallel to first longitudinal axis 114 and also has a front end 132 and a back end 134. Extending to the back end 134 is a captivated sleeve 136 which is receivable within the shank cavity 124. The captivated sleeve 136 is also made of a resilient material and also is capable of expanding radially.

Generally, when a solid shaft is rotated, centrifugal forces are generated within the shaft which tend to cause radial expansion of the shaft outward from the central axis of the shaft. Centrifugal force upon a member is dependent upon factors such as the distance of the member, or part of the member, from the axis of rotation. In a solid shaft, the shaft material acts to restrain radial expansion of the shaft. However, in a shaft with a bore therethrough, the outer portion of the shaft will still experience centrifugal force but there will be less material to restrain expansion. For this reason, when subject to centrifugal force caused by rotation, the radial expansion of a shaft with a bore therethrough will be greater than that of a solid shaft.

Throughout this discussion the term radial expansion stiffness, or expansion stiffness, will be used to describe the tendency of a member to radially expand when subjected to rotation about the member longitudinal axis. This radial expansion stiffness is a function of the member mass, the geometrical configuration of the member, the member material stiffness and the rotational velocity of the member. Further details of formulae demonstrating this relationship may be found in *Roark's Formulas for Stress and Strain*, by Warren C. Young, Sixth Edition, 1989.

A high expansion stiffness Will indicate a high resistance to radial expansion while a low expansion stiffness will indicate a low resistance to radial expansion. For the purposes of this discussion, it will be assumed that the material for both the first member and the second member is the same steel.

While benefits of this invention are available at any rotational speed, the coupling device is preferred for use with high speed rotation such as rotational speeds of 5,000 revolutions per minute and above.

Returning to FIGS. 2 and 3, depending on the relative position of the shank 112 and the head 130, the first longitudinal axis 114 may be offset from the second longitudinal axis 131 by an amount d.

The captivated sleeve 136 may be inserted within the cavity of the captivating collar 120 such that when the shank 112 and head 130 are rotated, the offset will be limited by the relative position of the sleeve 136 within the collar 120. Additionally, because of the configuration of the sleeve 136, the captivated sleeve 136 upon being rotated will radially expand at a greater rate than the captivating collar. For these reasons, not only is the offset d limited between the sleeve 136 and collar 120, but the captivated sleeve 136 tends to be radially expanded within the captivating collar 120 as the rotational speed increases. In this manner, the sleeve 136 essentially expands within the cavity 124 toward the collar 120 thereby reducing clearances between the two parts and, if the sleeve 136 contacts the collar 120, reducing the offset d which tend to self-center the sleeve 136 within the collar 120.

To secure the head 130 to the shank 112, apertures 138 exist within the head 130 which permit the introduction of bolts 140 which may be mated with receiving holes 142 within the shank 112. Cutting inserts 144 are secured about the periphery of the head 130 near and protruding from the front end 132 of the head 130. These cutting inserts 144 may be brazed to the head 130 using known techniques.

A retention knob 160 extends from the base portion 122 at the back end 118 of the shank 112 and is used to provide an axial force to hold the shank 112 within the tapered holder 162. A holding mechanism (not shown) is then used to provide tension against the retention knob 160 thereby holding the shank 112 within the tapered holder 162. Often times, for machine tools, robotic arms or other mechanical devices are utilized to transport shanks such as that shown in 112 and, for that reason, an annular groove 170 is provided about the perimeter of the base 122. Even though shown as two separate elements, it is possible to have a single integral element which includes the tapered shank 162 and the first member 112.

Figure 4:
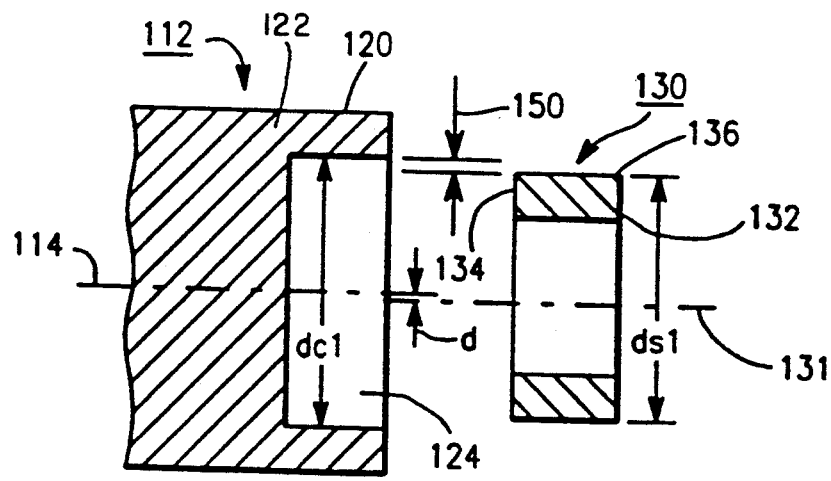
FIGS. 4, 5 and 6 are schematics illustrating the coupling device.
Figure 5:
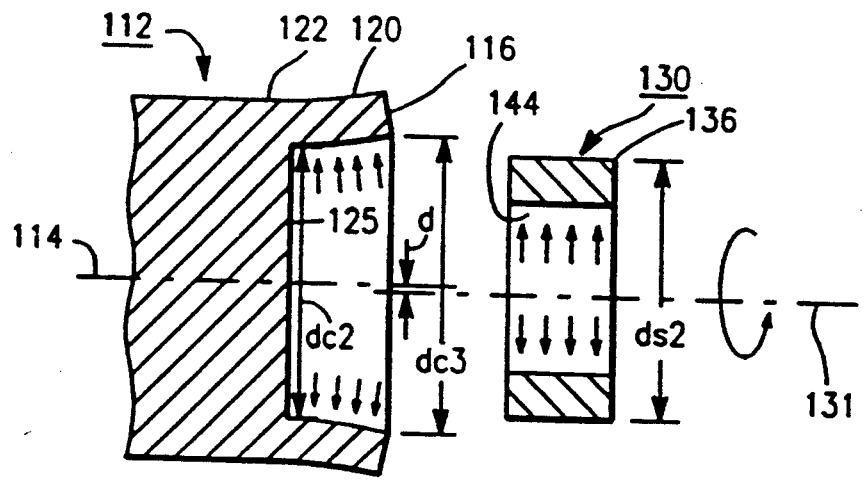
Figure 6:
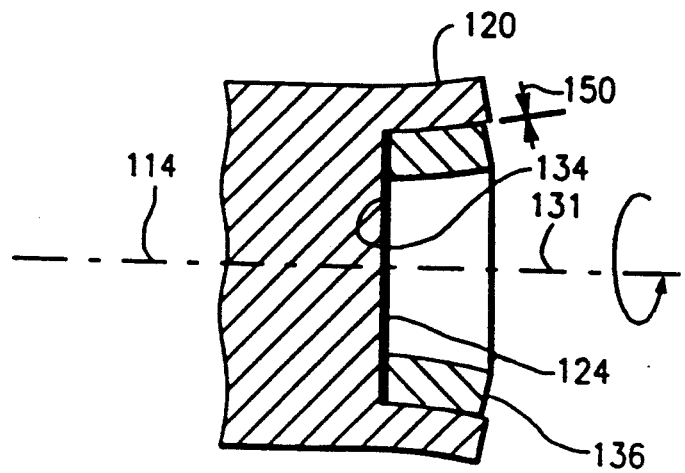

Turning to FIGS. 4–6, the operation of one embodiment of the invention will be discussed. FIG. 4 shows a schematic having parts representative of those parts discussed in FIGS. 2 and 3. Specifically, a first member or shank 112 is symmetrical about a first longitudinal axis 114. From the base 122 of the shank 112 extends a captivating collar 120 defining a cavity 124 within the shank 112. Additionally, a second member or head 130 symmetric about a second longitudinal axis 131 has a front face 132 and a back face 134 thereby defining a captivated sleeve 136. The inner diameter dc1 of the captivating collar 120 is slightly larger than the outer diameter ds1 of the captivated sleeve 136 so that the sleeve 136 may be inserted within the collar 120. As a result, a clearance 150 may exist between the sleeve 136 and the collar 120 and, furthermore, an offset d may exist between first longitudinal axis 114 and second longitudinal axis 131.

FIG. 5 illustrates the dynamics of the first member 112 and the second member 130 when subjected to rotation about the longitudinal axes. Directing attention to the captivated sleeve 136 of the head 130 and the secondary longitudinal axis 131 about which the sleeve 136 rotates, such rotation will generate centrifugal force which will urge the wall of the sleeve 136 away from the longitudinal axis 131 thereby increasing the diameter from ds1 (FIG. 4) to ds2. In FIG. 5, the sleeve 136 is shown unrestrained and, as such, the amount of radial expansion will be determined by the radial expansion stiffness. If the radial expansion stiffness of the sleeve 136 is less than that of the collar 120, then the sleeve 136 will radially expand a greater amount than the collar 120 such that the sleeve 136 essentially grows within the collar 120.

One way of accomplishing such a stiffness differential is to introduce a longitudinal bore 144 within the sleeve 136. A second way of providing a difference in expansion stiffness would be to utilize different materials for the collar 120 and the sleeve 136 with each material having a different material stiffness. Therefore, if the collar 120 and the sleeve 136 had different material stiffnesses, and specifically if the collar had a greater material stiffness that the sleeve 136, the sleeve could be solid and still expand within the collar 120. In this manner, a bore such as that shown as 144 would not be necessary for differential expansion. For the purposes of this discussion, the bore 144 will be included.

Focusing now on the first member or shank 112, upon being subjected to rotation about the first longitudinal axis 114, the base 122, which is shown to be solid in FIG. 5, will expand radially outwardly and the collar 120 will also expand, but to a greater degree than the base 122. Since the collar 120 is integrally attached to the base 122, at that point of attachment the collar will be restrained from expanding by the base 122. However, at the front end 116 of the shank 112, the collar 120 is less restrained and, as such, will experience greater expansion. The radial expansion of the collar 120 about the longitudinal axis 114 will be nonlinear.

As a result, at the one extreme location of the collar 120 adjacent the cavity floor 125, the collar 120 will have a diameter of dc2 and at the front end 116 of the shank 112 the collar 120 will have a diameter of dc3. Because the base 122 of the first member 112 is solid, the difference between dc1 in FIG. 4 and dc2 in FIG. 5 will be small relative to the difference between dc1 and dc3. However, ds2 of the sleeve 136 will be greater than dc2 of the collar 120. As indicated, the shank 112 and the head 136 discussed in FIG. 5 are shown expanded without interaction between the two members.

FIG. 6 now illustrates the configuration when the two members interact. In the unexpanded state the sleeve 136 (FIG. 4) will easily fit within the collar 120 with an existing clearance 150. As shown in FIG. 6, the sleeve 136 expands within the collar 120 until a portion of the sleeve 136 contacts the collar 120. Since the collar 120 at the cavity floor 124 expands the least amount of the entire collar, it is this area which is contacted first by the expanding sleeve 136. The expansion of the sleeve 136 will be limited by the contour of the collar 120. In this manner, the clearance 150 would be reduced and possibly eliminated thereby providing the equivalence of an interference fit between the sleeve 136 and the collar 120.

It should be noted that the initial contact between the sleeve 136 and the collar 120 will occur at the back face 134 of the sleeve since when inserted within the cavity 124 and rotated, the collar 120 is restrained from radial expansion by the base 122 while the sleeve 136 has no such limitation. It should be further noted that if the sleeve 136 were put into the cavity 124 in a position such that axis 114 and axis 131 did not coincide, then upon radial expansion the sleeve 136 would have a tendency to center itself within the collar 120. For this reason, the longitudinal axes 114 and 131 are shown as coinciding in FIG. 6. It should further be appreciated that the expansion of the sleeve 136 within the collar 120 may not be enough to align the two longitudinal axes 114 and 131 to coincide, any contact of the sleeve 136 against the collar 120 will urge the axes together and as such tend to reduce the offset distance d between the two.

Figure 7:
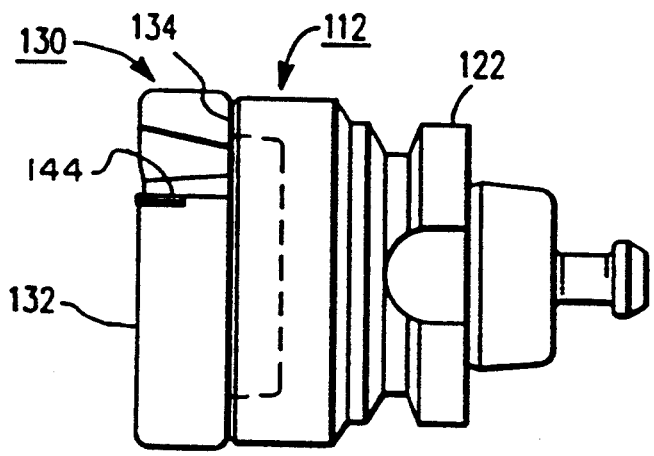
FIG. 7 is a side view of the coupling device in accordance with the invention.
Figure 8:
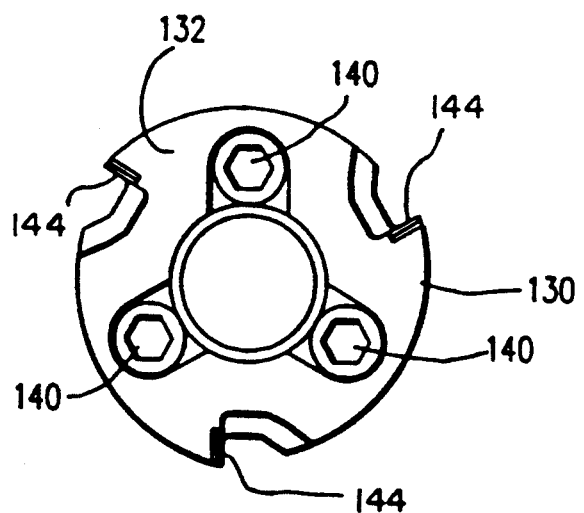
FIG. 8 is an end view of the coupling device shown in FIG. 7.
Figure 9:
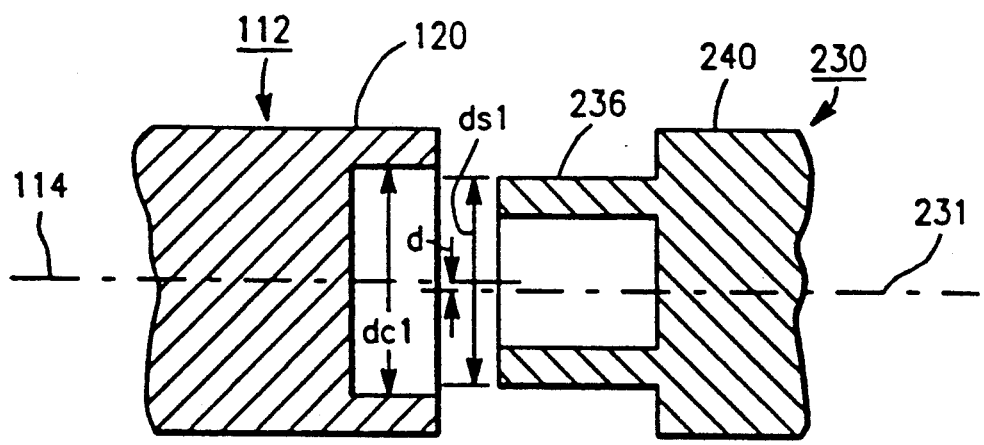
FIGS. 9, 10 and 11 are schematics of a second embodiment illustrating the mechanics of the coupling device in the present invention.

FIGS. 7 through 9 provide further details of the milling cutter 110 shown in FIGS. 2 and 3 and will now be viewed in light of the discussion relating to FIGS. 4 through 6.

Focusing attention on FIGS. 7 and 8, the head or second member 130 is shown attached to the shank or first member 112. Just as shown in FIG. 2, the cutting inserts 144 are positioned about the periphery of the head 130. It should be noted that the cutting inserts 144 protrude from the front end 132 of the head 130. It should be additionally noted that the bolts 140 are recessed from the front 132 of the head 130. In order to provide for proper mating of the head 130 and the shank 112, it is important that the back end 134 of the head 130 be perpendicular with the longitudinal axis 131 and at the front end 116 of the shank 112 be perpendicular with longitudinal axis 114, to assure that when the parts are mated, the two axes will still be parallel to one another.

It should be noted in FIG. 8 that bolts 140 are used to secure the head 130 to the shank 112. These bolts should be secured with a torque adequate to axially restrain the sleeve 136. A suggested torque for such bolts on a cutter such as that described in the mathematical model would be 70 in-lbs. Applying such a torque to these bolts may also affect the ability of the sleeve 136 to radially expand relative to the collar 120. It is believed, however, that when subjected to the actual operating conditions experienced by high speed rotating tool, induced vibration along with centrifugal forces generated by the head 130 will permit some relative sliding between the bolts 140 and the head 130 and between the head 130 and the collar 120.

Additionally, the apertures 138 (FIG. 2) within the head 130 are of a diameter slightly larger than that of the bolt 140 thread diameter and, for this reason, in those instances in which there is not relative motion between the bolts 140 and the head 130, it is likely that at high speed rotation, the centrifugal force generated by the sleeve 130 will be sufficient to flex the bolts 140 thereby permitting radially expansion of the head. However, it should be noted that under these circumstances, the radial expansion stiffness of the head will be influenced by the material stiffness of the bolts 140.

Utilizing the design of this invention, the longitudinal axes 114 and 131 as shown in FIGS. 2 and 3 will never be offset an amount greater than that produced when the sleeve 136 is abutting the collar 120. However, with increased rotational velocity and expansion of the head 130 relative to the collar 120, it is possible for these two longitudinal axes 114 and 131 to move closer together thereby minimizing the eccentricity between the two parts. At a rotational velocity great enough to provide contact between the head 130 and the collar 120, the head 130 would be centered within the collar 120 such that the longitudinal axes 114 and 131 would be overlapping. The material, which may be steel, is common to both the first member 112 and the second member 130.

The collar 120 is integral with a solid base 122 portion of the first member 112.

A mathematical model of the invention was created which included dimensions that were used for a prototype; however, unlike the detail shown in FIGS. 2, 3 and 7, the sleeve 136 and collar 120 were not tapered for mating. In such a model, both the first member 112 and the second member 130 including the collar 120 and the sleeve 136 were comprised of 4340 steel. The collar 120 of the first member 112 had an outer diameter of 1.5750 inches (4.000 cm) and an inner diameter of 1.3780 inches (3.500 cm) with a length of 0.285 inches (0.275 cm), thereby defining a cavity 124 of that depth. The sleeve 136 of the second member 130 had an outer diameter of 1.3778 inches (3.500 cm) and an inner diameter of 0.827 inches (2.101 cm) with a length of 0.276 inches (0.701 cm). In this manner the radial clearance 150 between the sleeve 130 and the collar 120 is 0.0001 inches (0.0003 cm). At a modeled speed of 30,000 revolutions per minute, the sleeve expanded relative to the collar 120 by an amount of 0.0001 inches (0.0003 cm) thereby eliminating the clearance between the sleeve 136 and the collar. Specifically, when rotated at 30,000 revolutions per minute, the sleeve 136 at the back end 134 radially expands 0.00006 inches (0.0002 cm) while the collar 120 at the cavity floor 125 radially expands 0.00003 inches (0.0001 cm) thereby providing a differential expansion of the sleeve 136 within the collar 120 of 0.00003 inches (0.0001 cm). In this instance the sleeve 136 did expand within the collar 120 but not to an amount to uniformly contact the collar 120.

Figure 10:
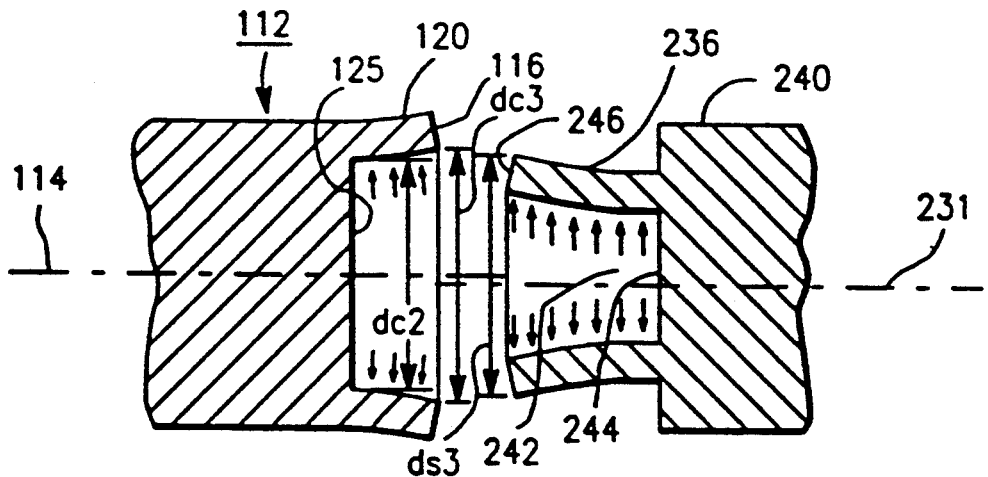
Figure 11:
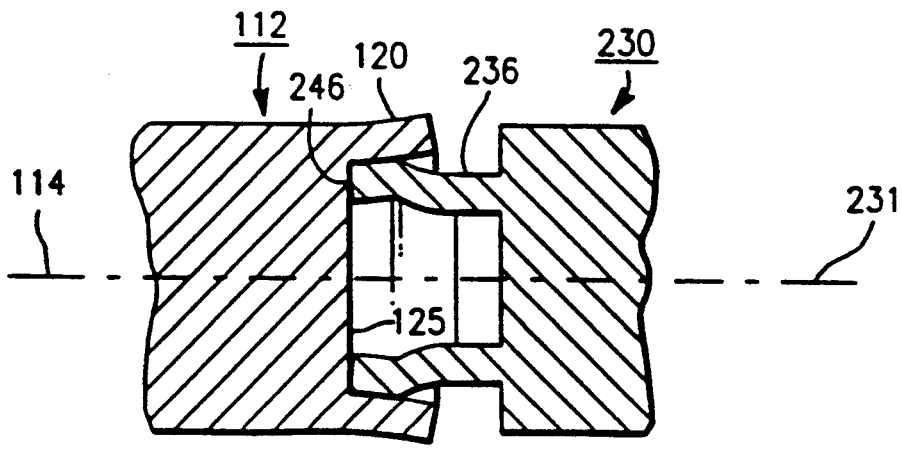

What has been described is an embodiment of the invention in which the head 130 had a radial stiffness less than that of the shank 112 by reason of a bore extending through the head 136. While this configuration has applications such as the milling cutter described, a second embodiment of the coupling device of this invention involves retaining the head 130, however, attaching a solid portion to the head 130 to permit other uses for the coupling device of this invention. In this manner, the coupling device may be utilized to couple two shafts neither of which is required to have a bore extending therethrough and the variety of tooling that could be attached to a shank would be increased. FIGS. 9-11 schematically illustrate this.

Focusing attention on FIG. 9, the first member or shank 112 is symmetric about the first longitudinal axis 114 and has features similar to those already discussed with the first member 112 in previous figures. However, a second member or head 230 is symmetrical about a second longitudinal axis 231 and may be offset by an amount d but rather than having a captivating sleeve 136 such as that shown in FIGS. 2-8 with a bore therethrough, the second member 230 is comprised of a captivated sleeve 236 integrally attached to a solid shank 240. Just as in the previous embodiment, the inner diameter dc1 of the collar 120 is less than the outer diameter ds1 of the captivated sleeve 236. However, unlike the relatively uniform radial expansion of the captivated sleeve 136 shown in FIG. 5, the captivated sleeve 236 shown in FIG. 9 is restrained by the solid shank 240. In such a manner the captivated sleeve 236 is confined and, therefore, expands in a manner similar to the collar 120 of the first member 112.

FIG. 10 is illustrative of this and the collar 120 of the first member 112 expands radially at the front end 116 of the member 112 to a diameter dc3 while the collar 120 in the region of the cavity floor 125 expands a lesser amount to a diameter of dc2. Once again, this expansion is nonlinear. With the captivated sleeve 236 integrally attached to the solid shank 240, a cavity 242 is formed having a cavity floor 244. Opposite the cavity floor 244 is the back face 246 of the sleeve 236. At a minimum rotational speed, the expanded diameter ds3 of the sleeve 236 is greater than the expanded diameter dc2 of the collar 120 at the cavity 125.

FIG. 11 shows first member 112 and second member 230 engaged with one another. Upon rotation of the two members as a unit as explained in a discussion of FIG. 10, the collar 120 will expand as will the sleeve 236. The sleeve back face 246 will expand radially a greater amount than the collar 120 at the cavity floor 125 thereby providing contact between the collar 120 and the sleeve 236. A mentioned previously, depending on the radial expansion stiffness of the respective members, the amount of contact between the sleeve 236 and the collar 120 will vary. Also, as discussed earlier, any such contact will tend to urge the first longitudinal axis 114 of the first member 112 toward the second longitudinal axis 231 of the second member 230 to a point at which the axes may be coinciding, as illustrated in FIG. 11.

The arrangement shown in FIGS. 9 through 11 indicates that the length of the sleeve 236 exceeds that of the collar 120 such that the shank 112 and the shank 240 do not abut. From the expansion profile shown in FIG. 10 it can be seen that even if the length of the sleeve 236 and collar 120 were equal and the shank 112 and shank 240 were able to abut, there would still be contact between the collar 120 and sleeve 236 at the back face of the sleeve 246 and the collar 120 near the cavity 125 occurring at a certain rotational speed.

While not shown in FIGS. 9, 10 and 11 just as not shown in FIGS. 4, 5 and 6, first member 112 may be secured to second member 230 in an axial manner similar to that shown in FIGS. 2, 3, 7 and 8. Axial bolts may be introduced into the solid shank 240 by providing at least one threaded bore partially through the solid shank 240 and exposing one side of that bore by introducing a groove along the side of the solid shank 240. In the alternative, first member 112 could be attached with second member 230 utilizing externally mounted flanges axially attached utilizing bolts between the two flanges.

Throughout this discussion, the expansion of the sleeve within the collar has been directed toward a situation in which the sleeve contacted the collar at some point along the length of the collar. By doing so, any offset between the longitudinal axes of the members tends to be reduced and the sleeve tends to become centered within the collar.

It is entirely possible to receive benefits from this invention even though the sleeve does not expand to contact the collar. Specifically, in a situation in which a sleeve is mounted within the collar and the parts are subject to high speed rotation by the configuration discussed in this invention, if the longitudinal axis of the collar and the longitudinal axis of the sleeve are not coincidental and an offset exists such that the sleeve contacts the collar at only a portion of the collar, then by the design of this invention, such eccentricity will either remain the same or reduce. However, such eccentricity will not increase. Because the sleeve is contained within the collar, any expansion of the sleeve which is greater than the expansion of the collar, will act to reduce clearances between the sleeve and the collar thereby reducing clearances between the two parts and moving the respective longitudinal axes closer to one another.

FIGS. 2, 3 and 7 illustrate a slight taper on the sleeve 136 and within the collar 120. This is intended for ease of insertion of the sleeve 134 within the collar 120. Upon rotation of the coupling device, it can be appreciated that the sleeve 136 radial expansion would tend to urge the sleeve 136 from the collar 120. While the bolts 140 maintain axial positioning of the sleeve 136, a preferred configuration is that shown in the schematics of FIGS. 4 and 9 in which the sleeve 136 and collar 120 have walls parallel to one another.

Since the coupling device of the subject invention is activated by rotation, it is possible that the device may be dynamically unbalanced. Conventional means for balancing rotating shafts may be used to remedy this situation. Such methods include selectively removing material from the device or positioning eccentric weights about the periphery of the device as discussed in U.S. Pat. No. 5,074,723, issued Dec. 24, 1991, entitled "Method and Apparatus for Balancing a Rotary Tool Assembly" by Massa et al., which is assigned to the applicant and is hereby incorporated by reference into this document.

While what has been described is a coupling device as applied to machine tools, and more specifically a milling cutter, it should be appreciated that this invention may be applied to areas other than machine tools as a coupling device for high speed rotation applications.

What has been described is a coupling device have a sleeve which expands within a collar upon rotation. Modifications may be made within the scope of the appended claims.

What is claimed is:

1. A coupling device for high rotational speed applications comprised of:
   a) a first member symmetrical about a first longitudinal axis and having a captivating collar extending from a base to a collar front face to define a cavity within the collar; and
   b) a second member symmetrical about a second longitudinal axis which may be offset from the first longitudinal axis and having a captivated sleeve integral with the second member and comprised of a cylinder having a solid wall to promote uniform radial expansion and receivable within said cavity.

2. The coupling device according to claim 1 wherein
   a) the captivating collar is made of a resilient material and has a radial expansion stiffness and
   b) the captivated sleeve is made of a resilient material and has a radial expansion stiffness which is less than that of the captivating collar,
   such that when the captivated sleeve is inserted within the captivating collar and the first member and second members are rotated, the captivated sleeve radially expands at a greater rate than the captivating collar and as the rotational speed increases contacts the captivating collar thereby tending to minimize or eliminate the offset between the first and second members.

3. The device according to claim 2 wherein the base of the first member is solid and is connected to the collar thereby providing the collar with a high radial expansion stiffness relative to the sleeve.

4. The device according to claim 2 wherein there is a clearance between the sleeve and the collar when the device is at rest and as the rotational speed of the device increases the clearance is reduced, thereby centering the sleeve within the collar.

5. The device according to claim 2 wherein there is an interference fit between the sleeve and the collar when the device is at rest and as the rotational speed of the device increases the sleeve is embedded against the collar with an increasingly greater radial force.

6. The device according to claim 1 wherein the base of the first member has a bore therethrough and the bore has a diameter less than the inner diameter of the sleeve, thereby providing the collar with a high radial expansion stiffness relative to the sleeve.

7. The device according to claim 1 wherein the second member is comprised entirely of the sleeve.

8. The device according to claim 7 wherein the front face of the sleeve is adapted to receive tooling.

9. The device according to claim 8 wherein the tooling is comprised of milling cutter inserts mounted peripherally about the sleeve front face and protruding beyond the front face.

10. The device according to claim 1 wherein the second member is further comprised of a base to which the sleeve is integrally attached.

11. The device according to claim 10 wherein the sleeve inner diameter is less than the collar diameter inner diameter and the sleeve length is equal to or greater than the collar length thereby providing the sleeve with a lower radial expansion stiffness than the collar.

12. The device according to claim 11 wherein the base of the second member is solid and adapted to receive a rotary tool.

13. The device according to claim 12 wherein the rotary tool is a rotary drill or an end mill.

14. The device according to claim 13 wherein the base of the second member has a bore therethrough and the bore has a diameter less than the inner diameter of the sleeve.

15. The device according to claim 1 wherein the first member is axially secured with the second member.

16. The device according to claim 15 wherein bolts extending through the sleeve and secured to threaded holes within the first member base are used to axially secure the first member to the second member.

17. The device according to claim 1 wherein the cross-sections of both the collar and the sleeve are circular.

18. The device according to claim 1 wherein the rotational speeds of the device are at least 5,000 revolutions per minute.

19. The device according to claim 1 wherein the device further includes a means for balancing the first and second members when mated.

20. A coupling device for high rotational speed applications comprised of:
   a) a first member symmetrical about a first longitudinal axis and having a captivating collar extending from a base to a collar front face to define a cavity within the collar wherein the captivating collar is made of a resilient material and has a radial expansion stiffness;
   b) a second member symmetrical about a second longitudinal axis which may be offset from the first longitudinal axis comprised of a captivated sleeve integral with the second member and comprised of a cylinder having a solid wall to promote uniform radial expansion and receivable within said cavity and wherein the captivated sleeve is made of a resilient material and has a radial expansion stiffness which is less than that of the captivating collar; and, c) wherein the front face of the sleeve is adapted to receive milling cutter inserts mounted peripherally about the sleeve front face and protruding beyond the front face such that when the captivated sleeve is inserted within the captivating collar and the first member and second members are rotated, the captivated sleeve radially expands at a greater rate than the captivating collar and as the rotational speed increases contacts the captivating collar thereby tending to minimize or eliminate the offset between the first and second members.

* * * * *